Aug. 21, 1962  R. KAPLAN ETAL  3,050,075
RETRACTABLE VEHICLE COVERING DEVICE
Filed July 5, 1960  2 Sheets-Sheet 1

INVENTORS.
ROSE KAPLAN
BERNICE PERNHALL
BY WILLIAM PERNHALL

AGENT.

INVENTORS.
ROSE KAPLAN
BERNICE PERNHALL
BY WILLIAM PERNHALL

AGENT.

United States Patent Office 3,050,075
Patented Aug. 21, 1962

3,050,075
RETRACTABLE VEHICLE COVERING DEVICE
Rose Kaplan, Bernice Pernhall, and William Pernhall,
all of 9310 Queens Blvd., Rego Park, N.Y.
Filed July 5, 1960, Ser. No. 40,717
1 Claim. (Cl. 135—5)

This invention relates generally to automobile covers and in particular to a novel automobile cover that is retractable within its own carrying case.

Heretofore, automibile covers have been made generally of a plastic material of a predetermined size and shape to fit differing sized vehicles. The present invention has been designed to be removably attached to a vehicle so that the protective cover may be withdrawn from its case and extended over the top of the vehicle. The cover may be provided with or without side pieces that drop down from the extended top portion to substantially enclose the vehicle. One of the prior disadvantages of existing covers was the difficulty experienced in setting the cover in place and particularly removing the cover when it was desired to utilize the vehicle. The present invention overcomes these prior disadvantages and accordingly is deemed to be a useful, practical device.

One of the principal objects of the invention resides in the provision of a container having means for positive attachment to the vehicle in which a cover is rolled up that may be withdrawn or unrolled to substantially cover the vehicle..

Another object of the invention resides in the container having means to substantially seal the opening through which the rolled cover is withdrawn when said cover is entirely retracted within the container.

Still another object of the invention is to provide a single container having a pair of retractable covers mounted therein, each of which can be independently withdrawn.

Yet another object of the invention is to provide gripping means to facilitate the manual withdrawal of the cover from the container.

Another object is to provide means for re-rolling the cover into the container.

Other ancillary objects will be, in part, hereinafter pointed out and will be, in part, hereinafter apparent.

Figure 1:
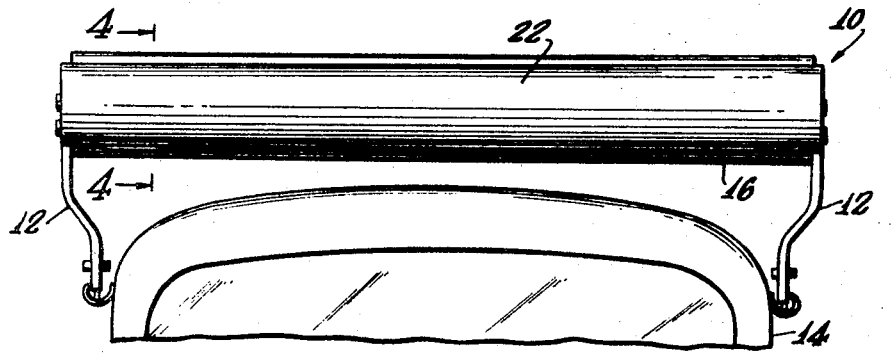
FIGURE 1 is a front elevation of the novel cover container mounted on the top of a vehicle.
Figure 2:
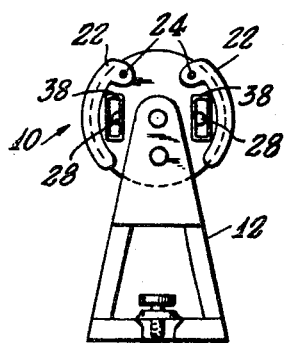
FIGURE 2 is a side elevation of the container with the cover retracted.
Figure 3:
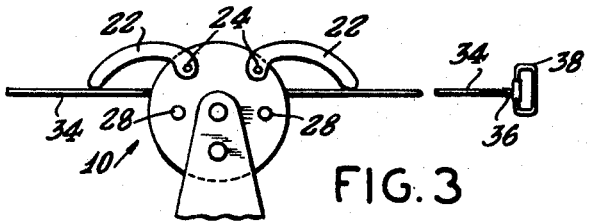
FIGURE 3 is a fragmentary side elevation of the container with the cover extended showing the displacement of the flaps.

Referring to the drawing in detail, 10 generally designates the container having a pair of side mounts 12 disposed on top of a vehicle 14. The container 10 generally consists of a tubing member 16 having a pair of longitudinal slots 18 therein. Pivotally mounted to the end pieces 20 of the container are a pair of flaps 22 which rotate on rivets 24 and gravitationally rest on the external portion of the tubular member 16 so as to cover the slots 18 respectively. Disposed within the tubular member 16 are a pair of rollers 26 which are journalled in suitable apertures in the end pieces 20 of the container 10. The ends of the rollers 26 are provided with a reduced diametrical portion 28 and centrally located therein is a slot 30 provided for a purpose hereinafter described.

Figure 5:
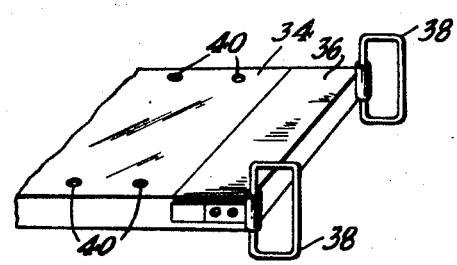
FIGURE 5 is a fragmentary projection of the external end of the cover.
Figure 4:
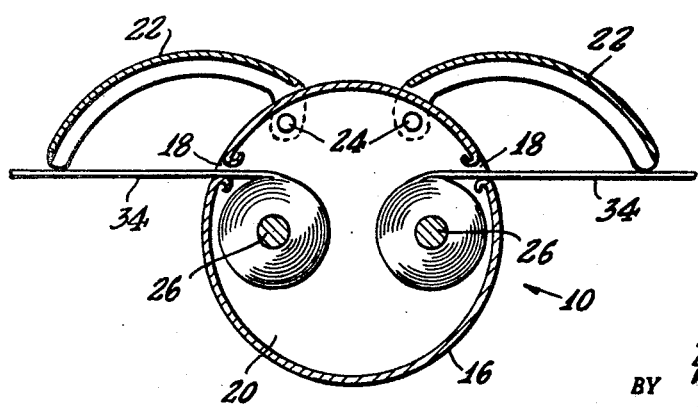
FIGURE 4 is a cross-sectional detail taken along line 4—4 of FIGURE 1, with the container flaps disposed open.
Figure 6:
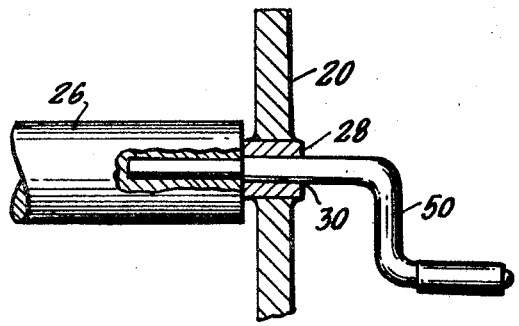
FIGURE 6 is a fragmentary detail of the rewinding mechanism.
Figure 7:
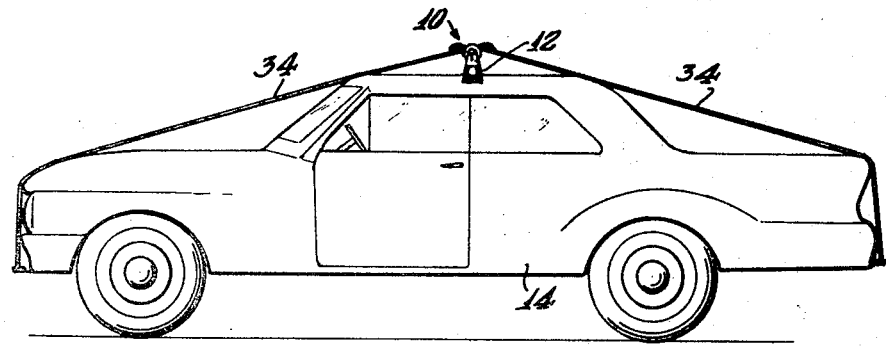
FIGURE 7 is a side elevation of a vehicle having the invention mounted centrally on the roof thereof with the cover extended in both directions.
Figure 8:
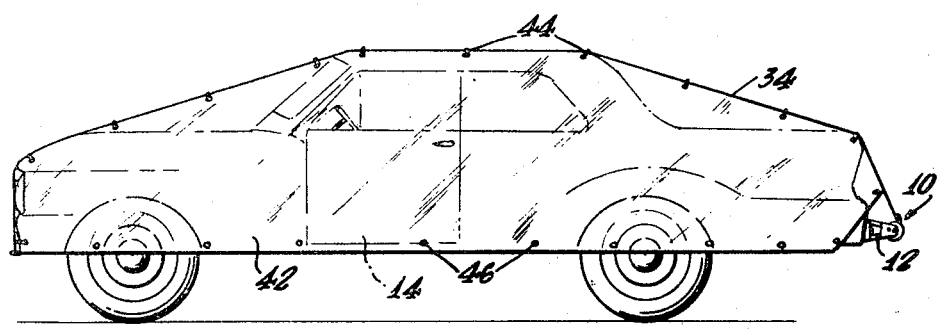
FIGURE 8 is a side elevation of a vehicle having the container mounted adjacent to the rear thereof with the cover extended over the vehicle and also showing a side portion attached to the top cover for covering the side of the vehicle.

Wound up on the rollers 26 is a cover 34 consisting of a thin plastic sheet such as vinyl or polyethylene. The cover 34 may be preferably opaque to provide a shade from the hot rays of the sun or the cover may be colored with reflective material to attract attention of other vehicles at nighttime. As shown in FIGURE 5, the external end of the cover 34 has a metallic bar 36 molded thereto to which is attached a pair of pulley rings 38. The rings 38 are readily gripped by the fingers and the person walking the length of the car extends the cover 34 over the length of the car as desired. Along the marginal edges of the cover 34 are spaced apertures 40 that are provided as a means of supporting side covers 42. The side covers 42 are similarly made from plastic material and small conventional hooks 44 are adapted to support the side cover 42 on the top cover 34. The lower horizontal margin of the side covers 42 are each provided with a plurality of spaced magnets 46 that readily attach themselves to the vehicle to retain the side covers 42 in place. The side covers 42 may be folded upon the cover 34 and retract therewith or may be independently stored and attached.

In northern climates where snow and other climatic conditions are prevalent, the cover 34 along with the side covers 42 readily enclose the vehicle to protect said vehicle from the ravages of such climatic conditions.

When it is desired to remove the cover, a crank 50 may be inserted in the slot 30 of the roller 26 and the roller manually rewound. In the event the side covers have been dropped, they may be placed on top of the cover 34 and rewound therewith or they may be removed, folded, and stored independently of the cover 34. It will be understood that the rollers 26 could be provided with a spring return mechanism, not shown, but of the type that is conventionally used with household window shades.

When the cover 34 is rewound within the container 10, the flaps 22 cover the slots 18 and substantially seal the openings 18 against the introduction of dirt or dust. Thus, the novel container 10 can remain mounted on the vehicle while the vehicle is used for transportation purposes.

Thus, it is apparent that there has been provided a device in which the several objects of the invention are achieved and which is well adapted to meet the conditions of practical use.

While there has been shown and described a single embodiment of the invention, it is to be understood that modifications and changes might be made without departing from the scope of the present invention, except as limited by the following claim.

In the claim:

A container adapted to be mounted on a vehicle for housing a pair of retractible vehicle covers comprising a tubular member having a length greater than the width of the vehicle upon which the container is to be mounted, an end wall closing each end of the container, a pair of arcuate flaps each having a length greater than the length of the container and each being provided with offset radially extending end sections, said end sections of each flap being pivotally secured to the end walls of the container, said flaps adapted to normally overlie a pair of diametrically opposite longitudinal slots formed in said container, each of said flaps being independently pivotal to expose the respective slot to permit the withdrawal and retraction of a pair of covers disposed within the container, a pair of container mounting members each being attached to the respective end walls of the container and depending downwardly and inwardly from the container, and each of said mounting members being formed with an offset base portion having means for attaching the member to the rain gutter on the vehicle.

References Cited in the file of this patent

UNITED STATES PATENTS

| | | |
|---|---|---|
| 1,719,055 | Herzer | July 2, 1929 |
| 1,918,423 | Persinger | July 18, 1933 |
| 2,609,042 | Chamberlain | Sept. 2, 1952 |
| 2,874,709 | Cohen et al. | Feb. 24, 1959 |